May 10, 1927.  1,627,810

A. B. SHULTZ ET AL

SHOCK ABSORBER

Filed May 8, 1926   2 Sheets-Sheet 1

A. B. Shultz Inventor
A. B. Casper
by Popp & Powers
Attorneys

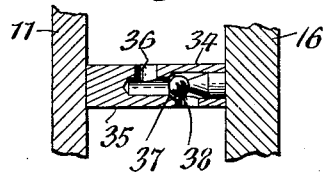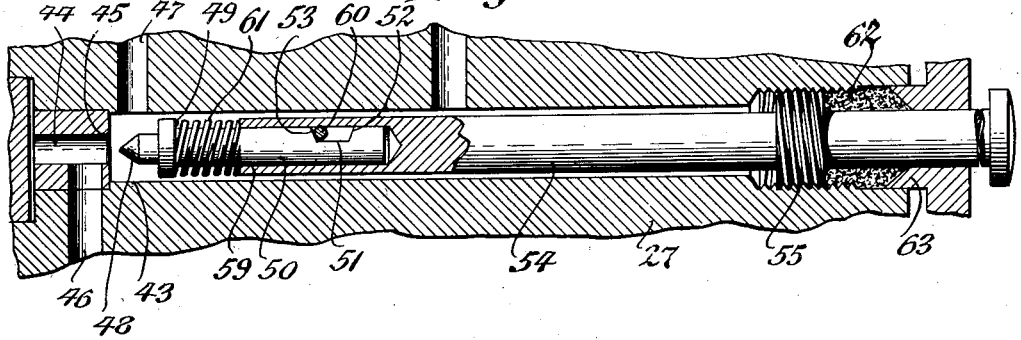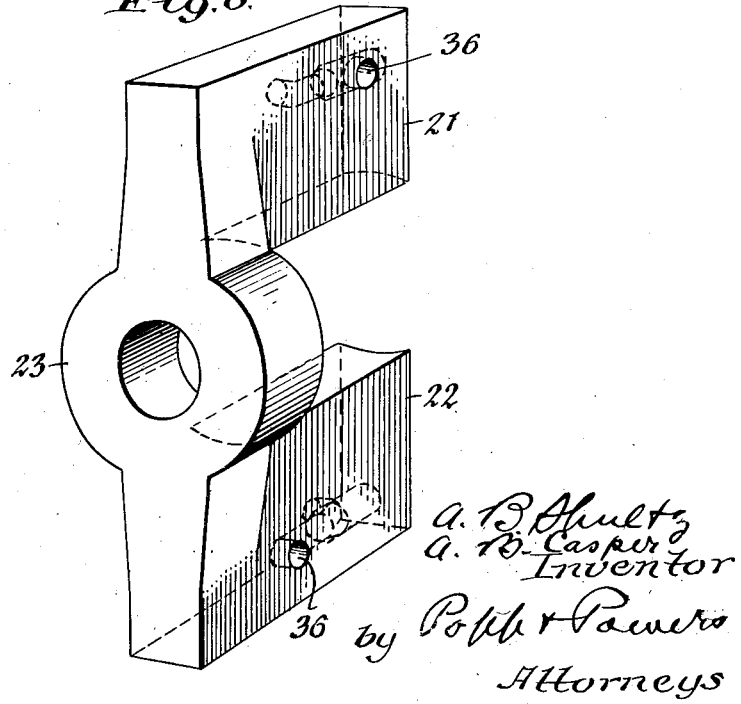

Patented May 10, 1927.

1,627,810

UNITED STATES PATENT OFFICE.

ALBERT B. SHULTZ AND ANTHONY B. CASPER, OF BUFFALO, NEW YORK, ASSIGNORS TO HOUDE ENGINEERING CORPORATION, OF BUFFALO, NEW YORK, A CORPORATION OF NEW YORK.

SHOCK ABSORBER.

Application filed May 8, 1926. Serial No. 107,595.

This invention relates to a shock absorber for automobiles and other purposes and more particularly to a shock absorber in which a piston oscillates within a semi-cylindrical pressure chamber containing a liquid which resists the movement of the piston and thereby absorbs the shock.

In shock absorbers of this character, as heretofore constructed, means have been provided which permit the flow of some of the liquid from that end of the chamber on the advancing side of the piston to that end of the chamber which is on the trailing side of the same in order to absorb the shock gradually. It has been found in practice that the oil, commonly used as the liquid resistant for this purpose, becomes stiff or congealed in cold weather and flows sluggishly or less freely through the regulating passages, provided for the same, thereby causing it to offer a greater resistance in winter time than at other seasons of the year, so that the absorber interferes with the resilient effect of the springs which support the load and reduces the ease and comfort of riding in the automobile.

It is the object of this invention to provide a shock absorber of this character which in warm weather will restrict the flow of the resistance liquid in the chamber from one side of the piston to the other with such freedom as will ensure a proper absorption of shocks under such weather conditions, but which permits of automatically increasing the capacity of the passages through which the resistance liquid flows from one end of the chamber to the other when the liquid thickens in cold weather and thus enables the liquid to flow more freely and prevents the car from riding hard or less easy during colder temperatures.

In the accompanying drawings:

Figure 4 is a fragmentary longitudinal section taken on line 4—4 Fig. 1.

Figure 5 is a fragmentary longitudinal section on an enlarged scale, of the rock shaft of the shock absorber and the automatic regulating and relief valve mounted therein in accordance with our invention.

Figure 6 is a perspective view of the partition which divides the cylinder into two semi-cylindrical chambers.

Similar characters of reference indicate like parts in the several figures of the drawings.

Figure 1:
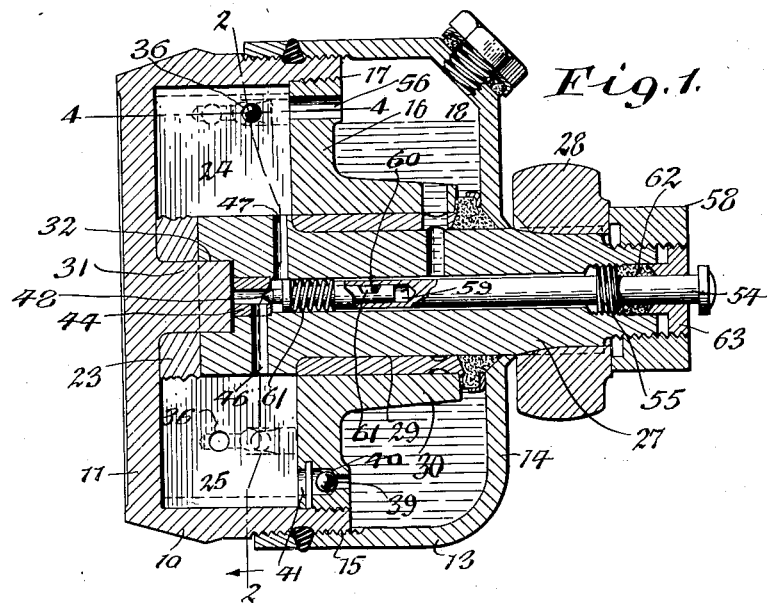
Figure 1 is a vertical longitudinal section of a shock absorber embodying our invention.
Figure 2:
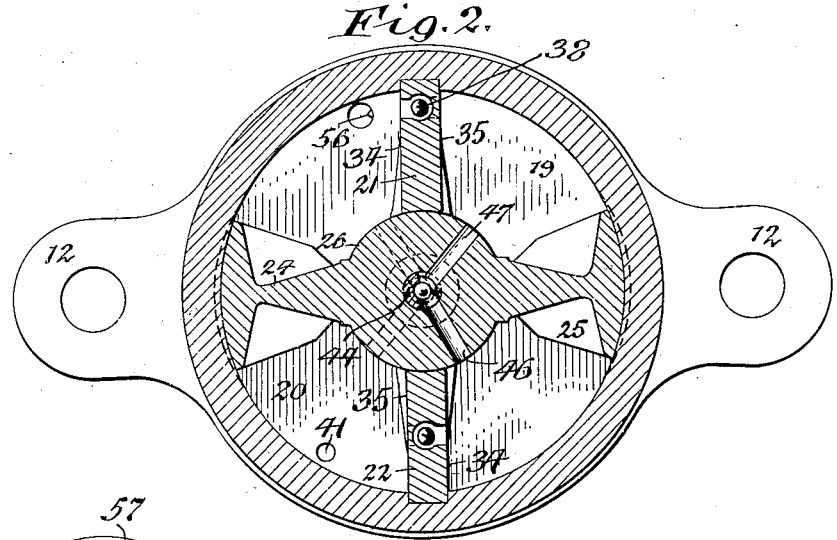
Figure 2 is a vertical cross section of the same taken on line 2—2 Fig. 1.
Figure 3:
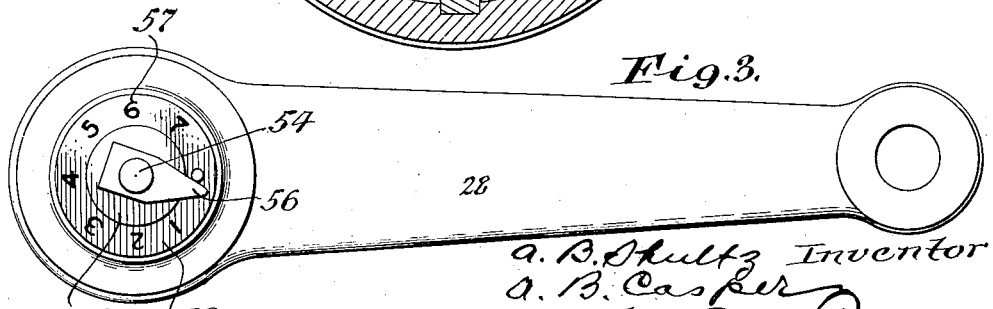
Figure 3 is an elevation of the rock arm and associated parts of the shock absorber containing our improvements.

The casing of the shock absorber comprises a rear section having an annular side wall 10 which is closed at its rear end by a transverse wall 11 having ears 12 for attaching the same to one of the relatively movable parts of an automobile, such as the frame, and a front section having an annular side wall 13, which is closed at its front end by a transverse front wall 14 while its rear end is connected by a screw joint 15 with the front end of the side wall of the rear casing section. The space within the casing is divided by a main transverse partition 16 which is preferably secured at its periphery in the bore of the side wall of the rear casing section by a screw joint 17. The space within the front casing section forms a storage chamber 18 for the oil, glycerine or the like which serves as the shock absorbing or resisting medium and which is held in reserve for supplying the pressure chambers 19 and 20 with liquid as required.

The pressure chambers 19, 20 are semi-cylindrical and formed in the rear casing section by a diametrical partition therein composed of two radial walls 21, 22 fitted at their outer ends in the bore of the side wall 10 and engaging their rear ends with the rear wall of the rear casing section, and their front ends with the main partition 16, and the inner edges of said walls 21, 22 being connected at their rear inner corners by a central disk 23.

Arranged within the pressure chambers, respectively, are two pistons 24, 25 which oscillate therein and are connected at their inner ends by a hub 26 which is interposed between the partition disk 23 and the main partition 16.

Projecting forwardly from the hub of the pistons is a main operating shaft 27 which extends through the main partition, the storage chamber and the front wall of the latter, to the exterior of the casing and is provided on its outer extremity with a rock arm 28 which is adapted to be connected with the axle of the car or other part which moves relatively to the frame.

The operating shaft is journaled in a bearing 29 formed in a sleeve 30 on the main partition and the pistons are maintained in alinement with the axis of the pressure chambers by a centering pin 31 formed on the rear wall of the casing and engaging with a circular recess 32 in the piston hub, as shown in Fig. 1.

Each of the pressure chambers is normally filled with a pressure resisting liquid such as oil or glycerine, on opposite sides of the piston therein and by-pass means are provided which permit the liquid to flow comparatively free from one side to the other of each partition while the piston is moving backward and effecting a low pressure stroke, but a reverse flow through the partitions is prevented, thereby offering a comparatively greater resistance while moving forward in the direction which effects a high pressure stroke of the piston. Suitable means for this purpose consist of a check passage 36 arranged in each piston and extending from the low pressure side 34 to the high pressure side 35 of the same, and provided with a valve seat 37 facing toward the high pressure side of the piston, and a check valve 38 arranged in the check passage and movable toward and from the seat 37; as best shown in Fig. 4.

During the forward or high pressure stroke of the pistons the check valves 38 engage their seats and prevent the passage through the partitions of resistance liquid, whereby the movement of the piston is retarded during rebound of the automobile springs. The movement of the pistons in the opposite direction is however, attended with little resistance because the valves 38 at this time open automatically under liquid pressure and permit the passage of liquid from the low pressure to the high pressure side of the piston while the springs of the auto are deflected under a shock or sudden load.

Wastage of liquid in the pressure chambers is replenished by the flow of resisting liquid from the storage chamber 18 through a passage 41 in the lower part of the main partition 16 which passage contains a valve seat 40 adapted to be engaged by a check valve 39.

Air is permitted to escape from the upper part of the cylinder to the storage chamber through a vent opening 56 in the partition.

Means are provided whereby the flow of pressure fluid from one side of the pistons to the other may be regulated to accurately adjust the shock resisting capacity of the shock absorber to the weight of the car and other conditions, which means are so organized that they also operate automatically to provide increased relief in case the oil or other resisting liquid has thickened due to cold weather or other conditions and thereby avoids hard riding of the car.

In the preferred form, these relief means are constructed as follows:

Formed lengthwise in the operating shaft and the hub of the pistons is a main relief passage 43 extending from the inner to the outer ends of the same. Arranged within the inner end of this passage is a bushing 44 which is provided at its front end with a valve seat 45, facing forward into the passage 43. In rear of this valve seat, the bore of the bushing communicates with rear branch relief passages 46 extending transversely through the bushing and the adjacent part of the piston hub to the periphery of the latter, on the trailing or lower pressure sides of the pistons. In front of this valve seat 45 the main passage 43 communicates with the front branch relief passages 47 extending transversely through the adjacent part of the piston hub to the periphery of the latter on the advancing or high pressure side of the pistons.

Within the main relief passage is arranged a valve or closure member 48 which is movable toward and from the valve seat and which is provided with a forwardly or outwardly facing shoulder 49. Projecting outwardly from the valve 48 is a valve stem 50 which is provided on its side with a notch 51 forming outer and inner shoulders 52, 53 on this stem. Arranged lengthwise within the outer part of the operating shaft is an adjusting rod 54 which is connected by a screw joint 55, with the outer part of this shaft so that upon turning this rod in one direction or the other—the same will be moved lengthwise either inwardly or outwardly in the shaft. Turning of this rod may be effected by a pointer 56 applied to the outer end of the rod and traversing a circular scale or row of graduations 57 on the outer face of a screw nut 58, which holds the rock arm on the operating shaft. At its inner end, the adjusting rod is provided with a longitudinal bore 59 which receives the stem of the regulating valve. The latter and the adjusting rod are compelled to turn together but the same are free to slip lengthwise one relative to the other, to a limited extent by means of a key or pin 60, passing transversely through the inner part of the adjusting rod and the notch of the relief valve stem, as shown in Figs. 1 and 5.

Surrounding this valve stem is a spring 61 which bears at its opposite ends against the shoulder of the relief valve and the inner end of the adjusting rod, and holds the relief valve yieldingly in a rearwardly projected position relative to the adjusting rod. Leakage between the adjusting rod and the operating shaft beyond the screw joint, between the same, is prevented by a packing 62 and a gland 63 engaging this packing and having a screw connection with the screw nut 58.

For the purpose of adjusting the shock absorber so as to properly cushion a shock under comparatively warm or summer temperature the adjusting rod is turned in the operating shaft so the same moves either forward or backwardly and brings the relief valve into the required position relative to the relief valve seat, that a normal flow of oil will be permitted from the high pressure to the low pressure side of each piston, while the pistons are moving in the direction for cushioning a rebound of the main springs of an automobile. While thus adjusting the rod, the relief valve moves bodily therewith, inasmuch as the relief spring is heavy enough to hold the relief valve in its fully projected position which is only limited by engagement of the outer shoulder 52 of the valve stem, with the coupling pin or key 60, as shown in Fig. 1, so that the adjusting rod and the relief valve at this time function as though the same were rigidly connected or made integrally.

If, during cold weather the oil thickens and flows less freely through the relief passages, so that a greater resistance is encountered by the pistons during their oscillating movement, particularly when moving in the direction for producing high pressure as the result of a rebound action, the increase pressure of the pistons which is exerted at this time upon the oil or other liquid resistant, will overcome the tension of the relief springs and force the relief valve farther away from the seat, as shown in Figure 5, and thereby reduce the obstruction to the flow of resisting liquid and permit the same to flow with greater freedom from the high to the low pressure sides of the pistons. As soon as the abnormal conditions subside, the relief valve is returned by its spring to the position in which it effects a maximum closure of the relief passages in accordance with the adjustment of the same for a particular load.

By this means, an automatic relief for the pressure resisting liquid is provided in case the liquid becomes so thick or sluggish in cold weather that it does not flow readily and thereby avoids interference with the easy-riding action of the usual spring suspension of the car. As the operation of this relief valve is entirely automatic when the cold weather reduces the fluidity of the resisting or cushioning liquid, no personal attention is required to adapt the same to varying temperature conditions.

Furthermore, this automatic relief will function in any part of the stroke of the pistons which renders it unnecessary to so connect the casing and operating shaft to the frame and axle of the car, that the pistons are in the central or neutral position in the pressure cylinders when riding over comparatively smooth roads, as has been necessary heretofore in order to secure the best cushioning effect when running over rough roads.

In the present structure the neutral zone of the pistons can be located anywhere by adjusting the relief valve to provide normal relief of the resisting liquid at all times, and a correspondingly increased automatic relief for the flow of the liquid, as any particular condition which may arise will require.

It will, therefore, be apparent from the foregoing, that this invention provides a normal adjustment for the instrument and also provides a safety valve which relieves high or excessive pressure when the fluid thickens during colder temperatures. Moreover, this valve assembly is particularly practical for production in quantities inasmuch as the valves can be made alike, but each valve can be set to a predetermined resistance although the spring tension has a great variation limit. The construction is such that the safety feature does not interfere with the normal adjustment, none of the working parts are weakened, and the several parts are of simple construction and will function at all times.

We claim as our invention:—

1. A shock absorber, comprising a pressure chamber, a piston oscillating in said chamber and having a hub provided with a passage leading from one side of said piston to the other and a valve seat in said passage, a valve member movable toward and from said valve seat, means for adjusting said valve member relatively to said seat, and spring means for yieldingly holding said valve member in its adjusted position.

2. A shock absorber comprising a pressure chamber, a piston oscillating in said chamber and having a hub, an operating shaft projecting from said hub, said hub and shaft having a longitudinal main passage, a valve seat in said passage and branch transverse passages extending from the main passage in front and in rear of said seat, to said pressure chamber on opposite sides of said piston, a valve member movable toward and from said valve seat, an adjusting member mounted on the shaft and having a sliding connection with said valve member, and a spring for holding said valve member yieldingly in a predetermined position relative to said seat.

3. A shock absorber comprising a pressure chamber, a piston oscillating in said chamber and having a hub, an operating shaft projecting from said hub, said hub and shaft having a longitudinal main passage, a valve seat in said passage and branch transverse passages extending from the main passages in front and in rear of said seat to said pressure chamber on opposite sides of said piston, a valve member movable toward and from said seat and having a valve stem, an adjusting rod having a screw connection with said shaft and a limited sliding connection with said valve stem, and a spring interposed between said valve member and adjusting rod and operating to hold the valve member yieldingly in its normal predetermined position relative to said seat.

4. A shock absorber comprising a pressure chamber, a piston oscillating in said chamber and having a hub, an operating shaft projecting from said hub, said hub and shaft having a longitudinal main passage, a valve seat in said passage and branch transverse passages extending from the main passage in front and in rear of said seat to said pressure chamber in opposite sides of said piston, a valve member movable toward and from said seat and having an outwardly facing shoulder, a stem projecting outwardly from said valve member and having a notch in its side, an adjusting rod having a screw connection with said shaft and a bore at its inner end which receives the outer end of said stem, and a pin arranged transversely on said rod and passing through the notch on said stem.

In testimony whereof we hereby affix our signatures.

ALBERT B. SHULTZ.
ANTHONY B. CASPER.